United States Patent Office 3,223,601
Patented Dec. 14, 1965

3,223,601
PROCESS OF FORMING DIELECTRIC
MATERIALS FOR CONDENSERS
Henri J. C. George, Paris, France, assignor to Quartz &
Silice S.A., Paris, France, a corporation of France
No Drawing. Filed June 14, 1960, Ser. No. 35,902
Claims priority, application France, June 26, 1959,
798,603, Patent 1,237,912
2 Claims. (Cl. 204—56)

This inveniton relates in general to dielectric materials and in particular to the fabrication of such materials for use in condensers.

In the electrolytic condenser art it has long been recognized that a rather substantial group of metals may be oxidized electrolytically to produce a dielectric layer which exhibits characteristics uniquely valuable for condensers of large capacitance. This group may be defined as those whose oxides exhibit a so-called "rectifying effect." Among the more important of these metals are aluminum, tantalum, titanium, zirconium and niobium.

However, for several reasons, only aluminum and tantalum have been widely used in the manufacture of electrolytic condensers on a large scale commercial basis. The major reason for the failure to use the other metals is related to the state of the metallurgical art. Good electrolytic condensers have always depended upon a base metal of the highest purity, and such a degree of purity has been obtainable only in aluminum and tantalum in mass production operations. In this connection, it is noteworthy that it is customary to use aluminum and tantalum having total impurities of less than one part in ten thousand for electrolytic condensers.

Because the anodes of such condensers are often in the form of sheets, wires, fritted masses or the like, the commercial use of otherwise suitable metals of the necessary degree of purity has been limited to aluminum and tantalum. Nevertheless, the other metals of the group enumerated above remain the object of much interest because certain of those metals may be electrolytically oxidized on a laboratory basis to produce dielectric layers which are of potentially great value, and which are superior to the oxides of aluminum and tantalum. For example, higher dielectric constants and greater chemical stability in the presence of the electrolytes may be had. Also, insulating layers having longer life and providing the same capacity as aluminum or tantalum in much thinner layers are possible. Furthermore, other metals of the group have a lower specific mass than tantalum which provides a weight advantage over condensers in which tantalum is used.

As is noted above, it has been determined that with electrolytically oxidized metals of the cited class a high degree of purity of the base metal is necessary to obtain the requisite condenser characteristics. The presence of certain impurities, especially metallic impurities, interferes with the continuity of the dielectrc layer whch is formed. Usually, a dielectric layer formed under such conditions possesses imperfections or porosities which render it useless in a condenser. Either the leakage current becomes excessive, the working voltage is too low, or condenser hysteresis or "memory effect" is too pronounced. Because the deleterious effects of impurities are so well known, most of the attention in the art of fabricating electrolytic condensers has been focused upon metallurgical improvements. That is, emphasis has been placed upon purification of aluminum and tantalum to ever higher degrees to improve condenser quality. Such work as has been done with the other metals of the group has been less successful, but the same approach has been followed.

It is, therefore, a primary object of the present invention to avoid the problem of extreme purification of base metals presently deemed esesntial in the development of dielectric layers using oxides of titanium.

It is another object of the present invention to improve the quality of electrolytic condensers.

It is still another object of the present invention to simplify the process of manufacturing dielectric layers particularly for condensers.

In general, the invention is organized about a process in which the dielectric layer is formed using neither the base metal nor its oxide, but rather a sub-oxide of the metal is utilized. The oxides of any of the cited metals are obtainable in much purer form and at less expense than are the metals themselves, and when such oxides are evaporated under vacuum and heat, partial decomposition takes place and a product is obtained which for lack of better definition in simple stoichiometric terms may be called a sub-oxide. Such a sub-oxide is actually a semiconductor which is sufficiently conductive itself to permit the subsequent formation of an electrolytically oxidized layer. A true oxide could not, of course, be so utilized because it is an insulator and is already completely oxidized.

In carrying out the process of the invention, a quantity of commercially available titanium dioxide, is placed in a crucible or on any suitable support in a vacuum bell jar. It is then heated by resistance, radiation or other well known method. As the evaporation proceeds, a decomposition takes place, significantly at temperatures ranging from about 1500° to 2000° C. This decomposition may be accelerated by the presence of a suitable reducing substance or medium in the crucible or on the support for the titanium dioxide. A layer of sub-oxide, distinguishable by its black appearance, appears at the range of temperatures cited. This sub-oxide presents a very different appearance from that noted in evaporating true oxide of titanium at lower temperatures of about 1200° C., where no decomposition appears to take place.

The layer which is obtained is conductive, although less so than pure titanium. Its resistivity is in the range of that of semiconductors. Collection of the product of evaporation may be made on conductive or nonconductive supports such as a metallic sheet, a wire or fritted powder, or upon an insulating sheet, rod or the like. Where conductive supports are used for the collection of the sub-oxide, the supports provide conductivity for subsequent eletrolytic oxidation; where insulating supports are used, the sub-oxide itself serves the conducting function.

Electrolytic oxidation is then carried out in the classic manner, using a bath which may contain borates, tartrates, citrates or the like dissolved in water, glycerine, glycol or other well-known solution. As the layer is formed under continuous potential, interference colors appear indicating the transformatiton of the sub-oxide into a transparent oxide of the base metal. The layer thus formed possesses dielectric characteristics which are eminently suitable for incorporation in condensers. For a better understanding of the present invention together with other and further objects, features and advantages, reference should be made to the following specification wherein a particular process is described in detail.

A quantity of commercially pure titanium dioxide ($TiO_2$) is placed upon a tantalum ribbon in a vacuum bell jar. If desired, a quantity of reducing material such as tantalum powder may also be placed in the jar, but this is not essential. The jar is pumped down to a pressure preferably lower than $10^{-3}$ mm. Hg, and a current is passed through the tantalum ribbon. The current is increased until a temperature of approximately 1200° C.

is reached. At this point, evaporation of the titanium dioxide powder begins. The temperature is then raised to a point between 1500–2000° C., causing abundant evaporation to take place. With the increased evaporation at the higher temperature, decomposition of the titanium dioxide powder also occurs. The evaporated material is collected on a dielectric sheet made, for example, of Pyrex which is disposed above the ribbon and powder. When the deposited material reaches a thickness of up to several microns, which may take as long as fifteen minutes or more, the sheet is removed and inserted in an electrolytic bath, the composition of which is not critical, but which may be an aqueous solution of 3% ammonium tartate. In the bath the sheet is set up as an anode and is oxidized by passing a current through the bath at a forming potential which will vary more or less inversely with the concentration of the solution. At the suggested 3% concentration the forming voltage may be 135–150 volts. This process is continued for about an hour and a half, and the layer which is formed exhibits dielectric characteristics of superior value for condenser applications.

Condensers having working voltages greater than 600 volts may be obtained by increasing the temperature of evaporation, the thickness of the deposit, or the nature of the electrolyte. However, in the example given, the charge per square centimeter for a smooth oxide layer may be of the order of 8 microcoulombs. At 500 volts, such a charge value provides a capacitance of 16,000 $\mu\mu f.$ per square centimeter. This capacitance can be even further increased by forming a rough rather than a smooth surface or by applying reagents to the layer of sub-oxide to increase the surface area. The leakage current of sheets formed in accordance with the process described is very low; in fact, values of 1 microampere per microfarad at 500 volts have been achieved. Moreover, extremely low hysteresis values are also realized. The dielectric is also highly stable chemically and the shelf life of condensers formed from the dielectric material is greatly increased because the oxide layer does not dissolve in the electrolyte.

This invention should not be limited to the exact process details disclosed nor to only the metals and materials cited because numerous suitable equivalents not presently considered to be important may also be utilized with excellent results. The invention should be limited only by the spirit and scope of the appended claims.

What is claimed is:

1. The process of forming dielectric materials for condensers utilizing titanium dioxide as a raw material which comprises placing a quantity of the titanium dioxide in a chamber in the presence of a reducing material, simultaneously evacuating said chamber and heating said titanium dioxide to a temperature in excess of that necessary to evaporate said titanium dioxide until decomposition of said titanium dioxide takes place, collecting evaporated materal in the form of a layer of sub-oxides, removing said layer from said chamber, and electrolytically oxidizing said layer.

2. The process of forming dielectric material for a condenser from titanium dioxide which comprises the steps of heating said titanium dioxide in the presence of the tantalum powder to a temperature of 1500° to 2000° C. under vacuum to cause decomposition and evaporation of said oxide, collecting the products of evaporation in the form of a sub-oxide layer, and electrolytically oxidizing said layer.

References Cited by the Examiner

UNITED STATES PATENTS

| | | | |
|---|---|---|---|
| 2,695,380 | 11/1954 | Mayer | 204—38 |
| 2,879,184 | 3/1959 | Coghill | 117—221 |
| 3,085,052 | 4/1963 | Sibert | 204—56 |
| 3,112,222 | 11/1963 | Alger | 111—221 |

FOREIGN PATENTS

| | | |
|---|---|---|
| 937,212 | 12/1955 | Germany. |
| 525,030 | 4/1955 | Italy. |

OTHER REFERENCES

Holland: "Vacuum Deposition of Thin Films," J. Wiley and Sons, Inc., 1956, pp. 466–467.

JOHN H. MACK, *Primary Examiner.*

JOSEPH REBOLD, *Examiner.*